(12) United States Patent
Demachi et al.

(10) Patent No.: US 8,054,850 B2
(45) Date of Patent: Nov. 8, 2011

(54) COMMUNICATION CONTROL SYSTEM

(75) Inventors: Koji Demachi, Tokyo (JP); Hiromichi Ebashi, Tokyo (JP); Kuniharu Akabane, Tokyo (JP); Takeshi Nakajima, Tokyo (JP); Takeshi Hongo, Tokyo (JP); Toyoaki Yokoi, Tokyo (JP); Kenji Habaguchi, Tokyo (JP); Masayuki Murakami, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 747 days.

(21) Appl. No.: 10/584,106

(22) PCT Filed: Aug. 11, 2004

(86) PCT No.: PCT/JP2004/011538
§ 371 (c)(1),
(2), (4) Date: Jun. 22, 2006

(87) PCT Pub. No.: WO2005/062537
PCT Pub. Date: Jul. 7, 2005

(65) Prior Publication Data
US 2008/0062954 A1    Mar. 13, 2008

(30) Foreign Application Priority Data
Dec. 22, 2003   (JP) ............................ P.2003-424540

(51) Int. Cl.
*H04L 12/16* (2006.01)
(52) U.S. Cl. ........ 370/438; 370/442; 370/345; 370/347; 370/210

(58) Field of Classification Search .................. 370/210, 370/321, 345, 442, 438
See application file for complete search history.

(56) References Cited

U.S. PATENT DOCUMENTS

| | | | |
|---|---|---|---|
| 5,541,919 A * | 7/1996 | Yong et al. .................... | 370/416 |
| 6,021,124 A * | 2/2000 | Haartsen ....................... | 370/336 |
| 7,075,909 B1 * | 7/2006 | Iinuma ......................... | 370/329 |
| 2003/0110435 A1 * | 6/2003 | Wu et al. ....................... | 714/748 |
| 2004/0062278 A1 * | 4/2004 | Hadzic et al. ................. | 370/503 |
| 2004/0179469 A1 * | 9/2004 | Attar et al. .................... | 370/208 |
| 2004/0223466 A1 * | 11/2004 | Schrader et al. ............. | 370/321 |

FOREIGN PATENT DOCUMENTS

| | | |
|---|---|---|
| JP | 2-272975 | 11/1990 |
| JP | 3-289834 | 12/1991 |
| JP | 9-282046 | 10/1997 |
| JP | 2000-244585 | 9/2000 |
| JP | 2001-285394 | 10/2001 |
| JP | 2003-125020 | 4/2003 |
| JP | 3457636 | 8/2003 |
| WO | WO-01/74702 | 10/2001 |

* cited by examiner

*Primary Examiner* — Huy Vu
*Assistant Examiner* — Omer Mian
(74) *Attorney, Agent, or Firm* — Westerman, Hattori, Daniels & Adrian, LLP

(57) ABSTRACT

A communication control system is provided that satisfies the needs of industrial applications in terms of real time properties, scalability and flexibility. For this purpose, the invention causes a communication station performing communications in accordance with a standard protocol to perform multiplex communications based on time division of a communication band. Communication is performed by dividing a communication cycle into time slots, and assigning a set of communication stations and a type of a communication section to each of the time slots.

17 Claims, 7 Drawing Sheets

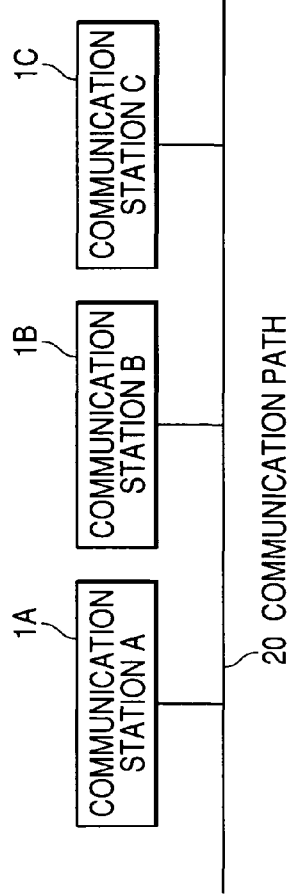
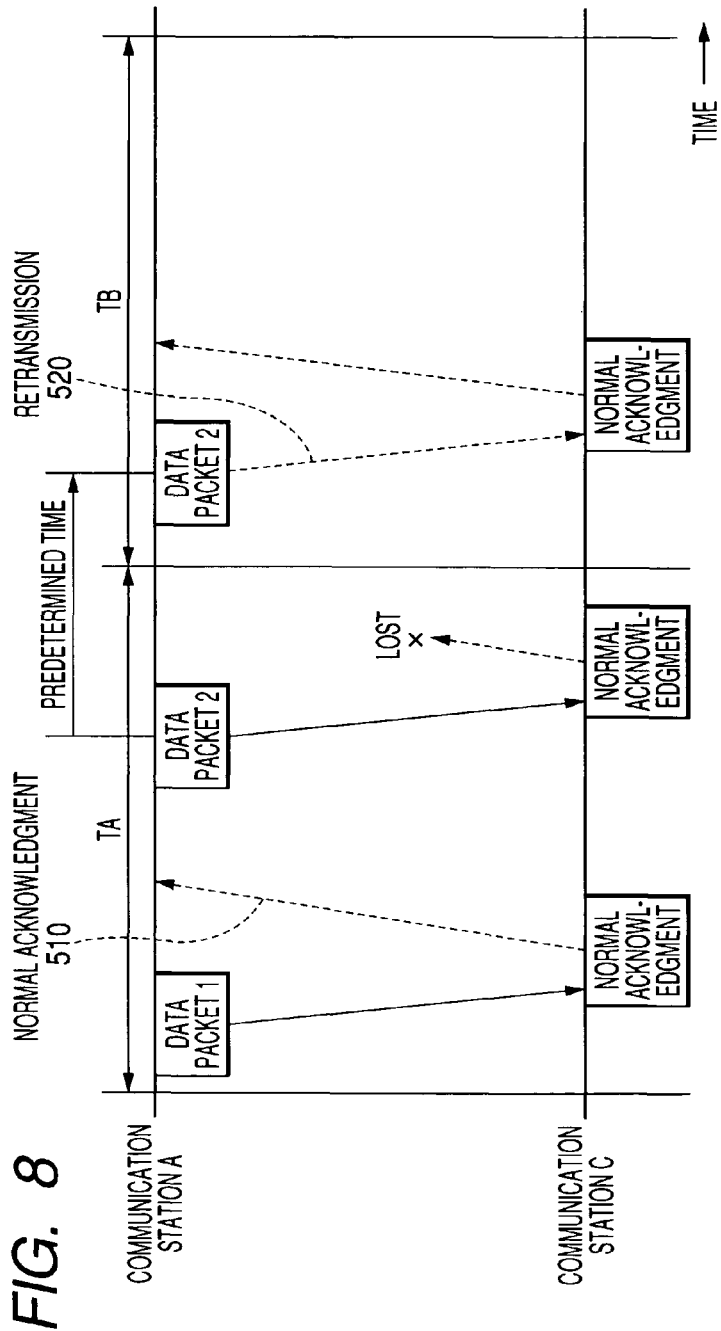

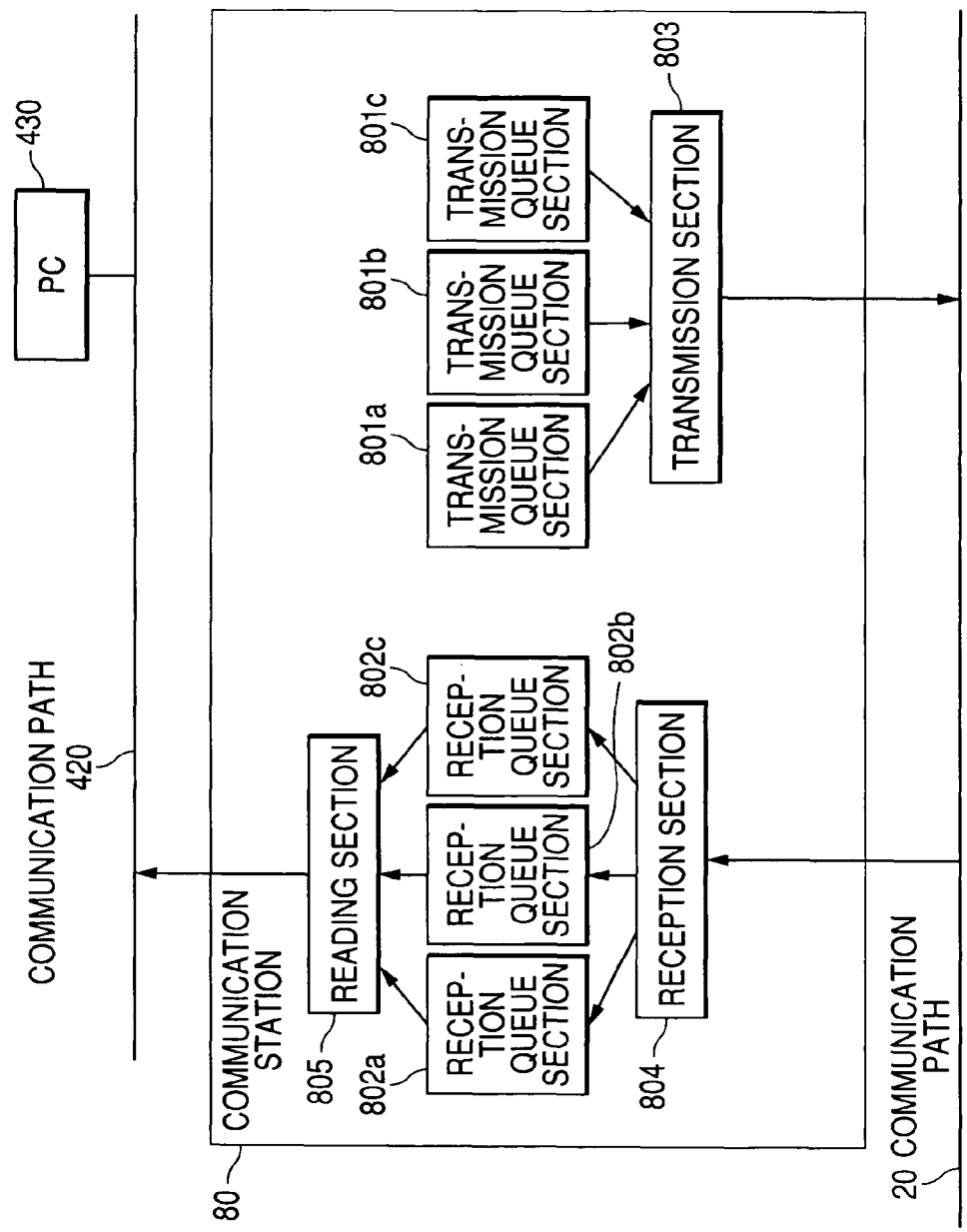

COMMUNICATION CONTROL SYSTEM

TECHNICAL FIELD

The present invention relates to a communication control system for controlling communications in an industrial application such as process control. The invention in particular relates to a communication control system to which a device has been applied for providing real time communications by the use of the Ethernet (registered trademark) and a standard communication protocol such as UDP/IP (User Datagram Protocol/Internet Protocol).

BACKGROUND ART

Communications in an industrial application includes, for example, communications in process control. Process control is made by a distributed control system. A distributed control system is used for plant operation control in a wide range of fields such as petroleum chemistry, steel, paper pulp, and electric power. Communications in an industrial application will be described by taking as an example a distributed control system.

FIG. 1 shows an exemplary configuration of a general distributed control system.

In FIG. 1, an operation monitoring apparatus 1 and a controller 2 are connected to a control bus 3. The controller 2 controls a plant 4 under the monitoring of the operation monitoring apparatus 1. The operation monitoring apparatus 1 is in charge of plant operation and monitoring. The operation monitoring apparatus 1 displays a screen for control operation and monitoring. In accordance with the scale of a plant, a plurality of controllers is distributed in the plant. The operation monitoring apparatus 1 and the controller 2 communicates with each other via a ¥ the control bus 3 to control the plant.

Sensor devices 5, 6 in the plant 4 detect process values of temperature, pressure, liquid level and the like. Degrees of openings of valves 7, 8 are controlled by way of an operation signal provided from the controller 2. An analog signal of 1 to 20 mA and 1 to 5V output from the sensor devices 5, 6 is input to the controller 2. Based on this input, the control unit (not shown) in the controller 2 performs control arithmetic operation and obtains an operation quantity. The operation quantity is output as an analog signal of 1 to 20 mA and 1 to 5V. This output is used to control the degree of opening of the valves 7, 8. For example, by controlling the degree of valve opening on a reaction oven, the process quantities of temperature and pressure are controlled.

A control bus in a conventional distributed control system is dedicated to process control. The protocol used by the control bus has been dedicated to process control.

Recently, with the remarkable progress in the IT (Information Technology) and web-related technologies, an open architecture has been demanded of the control bus of a distributed control system. With this background, it is under examination to apply a general-purpose bus and a standard protocol to a control bus. In order to apply a general-purpose bus and a standard protocol to a control bus, it is necessary to satisfy the requirements of communications in an industrial application.

Patent document 1 describes a communication system that determines whether an identifier attached to receive data takes priority and performs priority control of communications in accordance with the determination result thus assuring the real time properties of communications of priority data.

Patent document 1: Japanese patent No. 3457636

Conventionally, communications in an existing industrial application that is based on the Ethernet (registered trademark) and TCP/IP (Transmission Control Protocol/Internet Protocol) implements cyclic scan transmission on the UDP service in order to provide real time communications. This communication system (conventional communication system) assures some degree of real time properties although it does not sufficiently satisfy the scalability and flexibility. This is described below.

In order to perform data exchange in a large-scale system such as a distributed control system, use of a conventional communication system requires a large-capacity storage area.

Since a distributed control system performs broadcast communications, exchange of large amount of data may render a receiving communication band insufficient in conventional communication system. Thus, the conventional communication system is not advantageous in application to a large-scale system or exchange of large amount of data and does not sufficiently meet the need of industrial applications.

In the conventional communication system, data exchanged between communication stations is fixed. For example, given communication stations A, B, C and D, communication station A is set to exchange data with communication stations B, C and D. Communication station A is not designed to exchange data with communication station C alone. Communication station A must change its setting in order to exchange data with communication station C alone.

From this, it is not possible to selectively acquire necessary information from large amount of information on a network. Even when this is possible, the user needs time and workload for changing the setting.

Thus, the conventional communication system does not sufficiently meet the needs of industrial applications in terms of flexibility.

The invention has been accomplished to solve the problems. An object of the invention is to provide a communication control system that meets the needs of industrial applications in terms of real time properties as well as scalability and flexibility by implementing a real time communication protocol using a UDP service on the Ethernet (registered trademark) and a standard communication protocol such as UDP/IP.

DISCLOSURE OF THE INVENTION

In order to solve such problems, the invention is configured as follows:

(1) A communication control system for causing a communication station performing communication in accordance with a standard protocol to perform multiplex communication based on time division of a communication band, the communication control system comprising:

a time slot assignment section which divides a communication cycle as a basic cycle of time division into time slots, and assigns a set of communication stations and a type of a communication section to each of the time slots; and a time-division multiplex communication section which performs communication within a period of the time slot in accordance with the set of communication stations and type of communication section assigned by the time slot assignment section, wherein each communication station is equipped with a timer section and a time-synchronous communication section, the type of the communication section includes time-synchronous communication, the time-synchronous communication section performs time-synchronous communication by using the time slot in which the time-synchronous communication is assigned, and when the time-synchronous communication section transmits a time-synchronous communication frame to each communication station, time of the timer section of each communication station and the time slots of all communication stations are synchronized.

(2) The communication control system according to (1), wherein the set of communication stations is generated by grouping the communication stations based on addresses of the respective communication stations.

(3) The communication control system according to (1) or (2), wherein the type of the communication section includes at least one of 1-to-N non-cyclic data communication, 1-to-N cyclic data communication, 1-to-1 non-cyclic data communication and 1-to-1 cyclic data communication.

(4) The communication control system according to (3), wherein the 1-to-1 non-cyclic data communication is at least one of an acknowledge type communication which is the 1-to-1 non-cyclic data communication and in which a receiving station returns an acknowledgment to a transmitting station when the receiving station normally receives data, and a negative acknowledge type communication which is the 1-to-1 non-cyclic data communication and in which the receiving station returns a negative acknowledgment to the transmitting station when the receiving section cannot receive the data normally.

(5) The communication control system according to (1), (2) or (4), wherein each communication station is equipped with a timer section and a time-synchronous communication section, and time of the timer section of each communication station and the time slots of all communication stations are synchronized by the time-synchronous communication section.

(6) The communication control system according to (1), wherein the communication section is a communication section for performing 1-to-N non-cyclic data communication, and the communication section includes:

a data transmission section for broadcasting data packets to a group address as destinations of a plurality of communication stations; and a data reception section for receiving a transmitted data packet when a destination address of the transmitted data packet is a group address to which the home communication station belongs.

(7) The communication control system according to (1), wherein the communication section is a communication section for performing 1-to-N cyclic data communication, and the communication section includes:

a data transmission section for broadcasting data packets in a fixed cycle to a group address as destinations of a plurality of communication stations;

a plurality of receive buffers each of which stores reception time of a received data packet and the data packet as a pair;

a packet reception section which attaches the reception time to the received data packet and sequentially stores the data packet one by one into the plurality of receive buffers when a destination address of the received data packet is a group address to which the home communication station belongs; and a receive buffer reading section which reads the data packet from the receive buffer having the latest reception time among the plurality of receive buffers, completes readout in a period shorter than the cycle of the broadcasting, and sends the data packet to a higher-level side.

(8) The communication control system according to (1), wherein the communication section is a communication section for performing 1-to-1 non-cyclic data communication and an immediate-response type communication, and the communication section includes:

a data transmission section for transmitting a data packet to a single communication station, and retransmits the data packet in a case where a normal acknowledgment is not returned from a receiving station within a predetermined time; and a data reception section for transmitting a normal acknowledgment when a data packet is normally received.

(9) The communication control system according to (8), wherein the data transmission section retransmits the data packet independently of the time slot.

(10) The communication control system according to (8), wherein the data reception section transmits the normal acknowledgment independently of the time slot.

(11) The communication control system according to (1), wherein the communication section is a communication section for performing 1-to-1 non-cyclic data communication and a negative acknowledge type communication, and the communication section includes:

a data transmission section for transmitting a data packet with a sequence number being attached, the sequence number being changed for each transmission; and a data reception section which checks a sequence number being attached to a data packet each time the data packet is received, and transmits a negative acknowledgment packet to a transmitting station when detecting a lost sequence number as a result of checking, wherein the data reception section attaches a sequence number specifying the data packet that is received normally at the latest to the negative acknowledgment packet, when the data transmission section receives the negative acknowledgment packet, the data transmission section sequentially retransmits data packets starting with an undelivered data packet being specified by the sequence number attached to the negative acknowledgment packet, when the data transmission section does not transmit a subsequent data packet for a predetermined time on completion of the transmission of the data packets, the data transmission section transmits a delivery acknowledgment packet to a receiving station, and when a sequence number specified by a returned acknowledgment packet does not indicate the last transmitted data packet, the data transmission section sequentially retransmits data packets starting with an undelivered data packet specified by the returned acknowledgment packet, and when the data reception section receives the delivery acknowledgment packet, the data reception section returns to the transmitting station an acknowledgment packet to which a sequence number specifying the last received data packet is attached.

(12) The communication control system according to (11), wherein the data reception section attaches a sequence number specifying the data packet that is received normally at the latest to the negative acknowledgment packet, and when the data transmission section receives the negative acknowledgment packet, the data transmission section sequentially retransmits data packets starting with an undelivered data packet being specified by the sequence number attached to the negative acknowledgment packet.

(13) The communication control system according to (11), wherein when the data transmission section does not transmit a subsequent data packet for a predetermined time on completion of the transmission of the data packets, the data transmission section transmits a delivery acknowledgment packet to a receiving station, and when a sequence number specified by a returned acknowledgment packet does not indicate the last transmitted data packet, the data transmission section sequentially retransmits data packets starting with an undelivered data packet specified by the returned acknowledgment packet, and when the data reception section receives the delivery acknowledgment packet, the data reception section returns to the transmitting station an acknowledgment packet to which a sequence number specifying the last received data packet is attached.

(11) The communication control system according to (11), wherein the data reception section performs transmission of the negative acknowledgment packet and the acknowledgment packet independently of the time slot.

(17) The communication control system according to (1), wherein the communication section is a communication section for performing 1-to-1 cyclic data communication, and the communication section includes:

a transmission requesting section for requesting cyclic transmission of a data packet addressed to a specified communication station by a start request packet, based on a data acquisition request;

a halt requesting section for requesting a halt of cyclic transmission of the data packet by a halt request packet;

a data transmission section which, when receiving the start request packet, starts transmission of a data packet being specified by the start request packet to a communication station of a requesting source in a cycle specified by the start request packet, and halts transmission of the data packet on receiving a halt request packet; and a data reception section for receiving the data packet, wherein the data reception section includes:

a plurality of receive buffers each of which stores reception time of the received data packet and the data packet as a pair;

a packet reception section which attaches the reception time to the received data packet and sequentially stores the data packet one by one into the plurality of receive buffers; and a receive buffer reading section which reads the data packet from the receive buffer having the latest reception time among the plurality of receive buffers, completes readout in a period shorter than the cycle specified by the start request packet, and sends the data packet to a higher-level side.

(16) The communication control system according to (15), wherein the data reception section includes:

a plurality of receive buffers each of which stores reception time of the received data packet and the data packet as a pair;

a packet reception section which attaches the reception time to the received data packet and sequentially stores the data packet one by one into the plurality of receive buffers; and a receive buffer reading section which reads the data packet from the receive buffer having the latest reception time among the plurality of receive buffers, completes readout in a period shorter than the cycle specified by the start request packet, and sends the data packet to a higher-level side.

(13) The communication control system according to (1), which performs time-division multiplex communication by using the time slots, the communication control system comprising:

a plurality of transmission queue sections which exists between predetermined layers of an OSI layer model, is provided for each type of communication and constitutes a queue of transmission packets;

a plurality of reception queue sections which exists between predetermined layers of the OSI layer model, is provided for each type of the communication and constitutes a queue of reception packets;

a transmission section for transmitting packets in the plurality of transmission queue sections in accordance with a predetermined priority order with priority information corresponding to the transmission queue section being attached;

a reception section for distributing and storing received packets in the plurality of reception queue sections in accordance with the priority information; and a reading section which reads data stored in the plurality of reception queue sections in accordance with a predetermined priority order, and sends the data to a higher-level side.

(18) The communication control system according to (17), wherein the transmission section executes transmission processing of specific transmission queue section among the plurality of transmission queue sections in a case where data does not exist in the transmission queue section that has higher priority over the specific transmission queue section.

(19) The communication control system according to (17), wherein the reading section executes reading processing of specific reception queue section among the plurality of reception queue sections in a case where data does not exists in the reception queue section that has higher priority over the specific reception queue section.

(20) The communication control system according to any one of (13) to 19, wherein the transmission queue section and the reception queue section exist between a second layer and a third layer of an OSI layer model.

(17) The communication control system according to (1), wherein the standard protocol is UDP or IP.

As understood from the discussion, the invention has the following advantages:

(1) A real time communication protocol using a UDP service is implemented on the Ethernet (registered trademark) and a standard communication protocol such as UDP/IP. A communication cycle is divided into time slots. Each time slot is assigned with a set of communication stations and a type of communication section and communications are performed. In this way, each time slot is assigned with a proper communication system in accordance with the characteristics of information.

This provides a communication control system that satisfies the needs of industrial applications in terms of scalability and flexibility.

(2) Multiplex communications are made using time slots on a time division basis, so that respective communication systems do not influence each other.

(3) A communication station performs communications with another communication station only when necessary. This reduces the data quantity handled by a communication station thus reducing the memory area of the communication station. This configuration readily supports a larger number of communication stations or large amount of communication data, thus satisfying the needs of industrial applications in terms of scalability.

BRIEF DESCRIPTION OF THE DRAWINGS

FIG. 7 shows a connection example of a communication station;

FIG. 8 is a time chart showing the communication procedure of the communication station in FIG. 7;

FIG. 14 is a block diagram showing another embodiment of the invention.

BEST MODE FOR CARRYING OUT THE INVENTION

The invention will be detailed referring to drawings.

(1) First Embodiment

Figure 1:
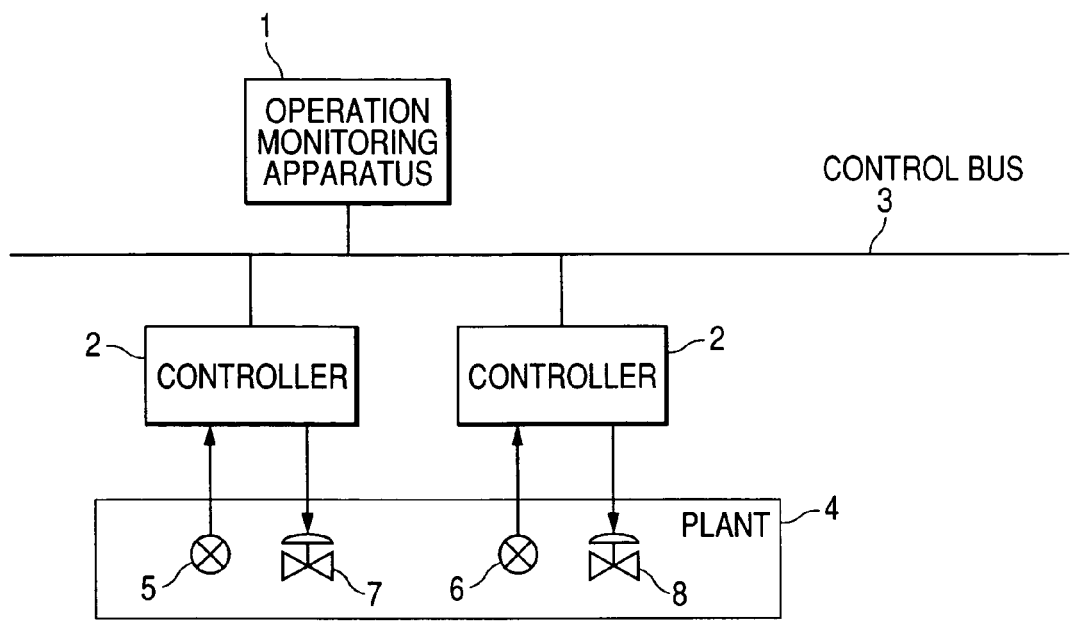
FIG. 1 shows an exemplary configuration of a general distributed control system.
Figure 2:
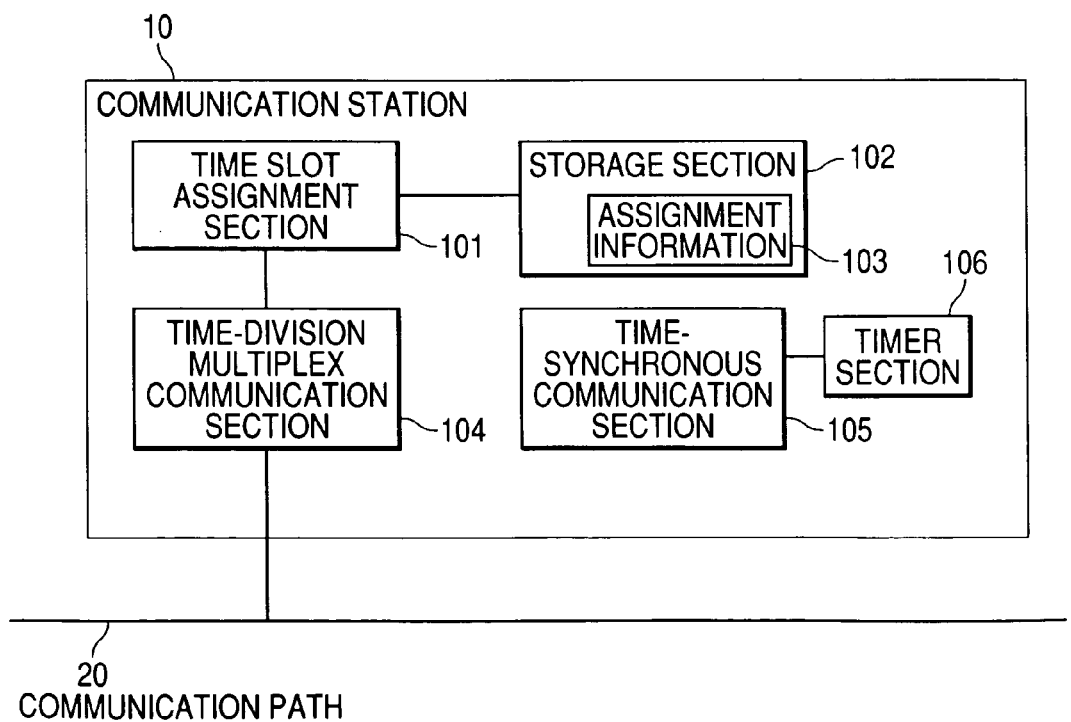
FIG. 2 is a block diagram showing an embodiment of the invention.

FIG. 2 is a block diagram showing an embodiment of the invention.

In FIG. 2, a communication station 10 is connected to a communication path 20. The communication path 20 is for example a control bus in a distributed control system.

The communication station 10 performs communications in accordance with a standard protocol. A standard protocol is for example UDP or IP. The communication station 10 is in charge of multiplex communications by a time division of a communication band.

In the communication station 10, a time slot assignment section 101 divides into time slots a communication cycle having a certain time length and serving as a base cycle of time division, and assigns a set of communication stations and a type of communication section to each time slot.

A set of communication stations is generated by grouping communication stations based on the address of each communication station. Grouping methods include grouping based on a network address and grouping based on a MAC (Media Access Control) address.

The types of communication section include time-synchronous communications, 1-to-N non-cyclic data communications (N being an integer equal to or more than 2), 1-to-N cyclic data communications, 1-to-1 non-cyclic data communications, and 1-to-1 cyclic data communications.

1-to-1 non-cyclic data communications include acknowledgment type communication and negative acknowledgment type communication.

In the acknowledgment type communication, a receiving station returns an acknowledgment to a transmitting station on successful receipt of data. In the negative acknowledgment type communication, a receiving station returns a negative acknowledgment to a transmitting station on failure in receipt of data.

Storage section 102 stores assignment information 103 indicating the set of communication station and the type of communication section assigned to each time slot.

Time-division multiplex communication section 104 performs communications within the corresponding time slot in accordance with the set of communication station and the type of communication section assigned by the time slot assignment section 101. In the time-division multiplex communication section 104 are provided communication section for performing all types of communications (time-synchronous communications, 1-to-N non-cyclic data communications, 1-to-N cyclic data communications, 1-to-1 non-cyclic data communications, and 1-to-1 cyclic data communications).

Each communication station is provided with time-synchronous communication section 105 and timer section 106.

When the time-synchronous communication section 105 transmits a time-synchronous communication frame to each station, the timer section 106 of all communication stations are synchronized. This synchronizes the time slots of all communication stations.

Figure 3:
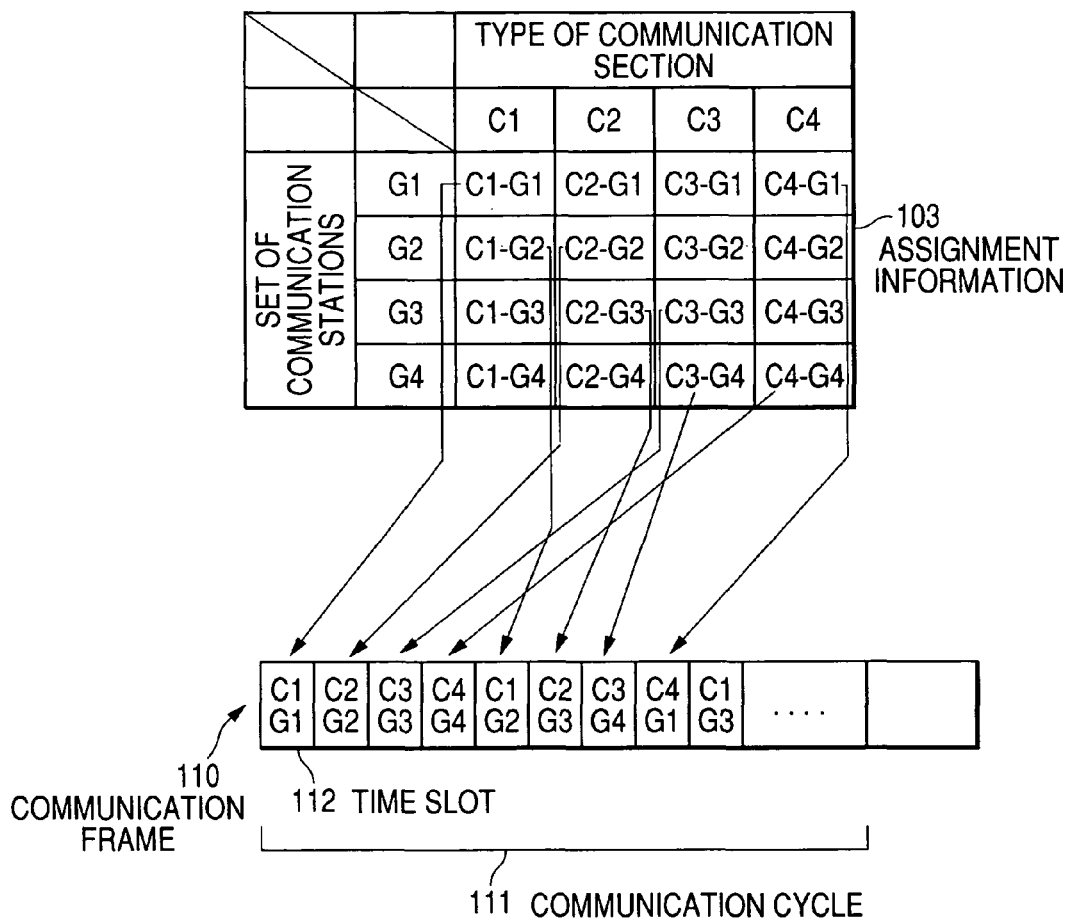
FIG. 3 is an explanatory diagram showing how to assign assigning information to time slots.

FIG. 3 is an explanatory diagram showing how to assign assigning information to time slots.

In FIG. 3, assignment information 103 is given in a table format. The vertical axis of the table represents the sets of communication stations G1 through G4 while the horizontal axis represents the sets of communication section C1 through C4.

A communication cycle 111 in a communication frame 110 is a basic cycle having a certain length. The communication cycle 111 is divided into time slots 112. Each time slot is assigned a set of communication stations and a type of communication section. For example, a first time slot is assigned a set of communication stations G1 and a set of communication section C1. A second time slot is assigned a set of communication stations G2 and a set of communication section C2. Each time slot performs communications in accordance with the assigned set of communication stations and type of communication section.

In this way, a communication frame is divided into time slots for multiplex communications.

According to the embodiment shown in FIG. 2, a communication cycle is divided into time slots and each slot is assigned a proper communication system in accordance with the characteristics of information. This provides a communication control system that satisfies the needs of industrial applications in terms of real time properties, scalability and flexibility.

(2) Second Embodiment

Figure 4:
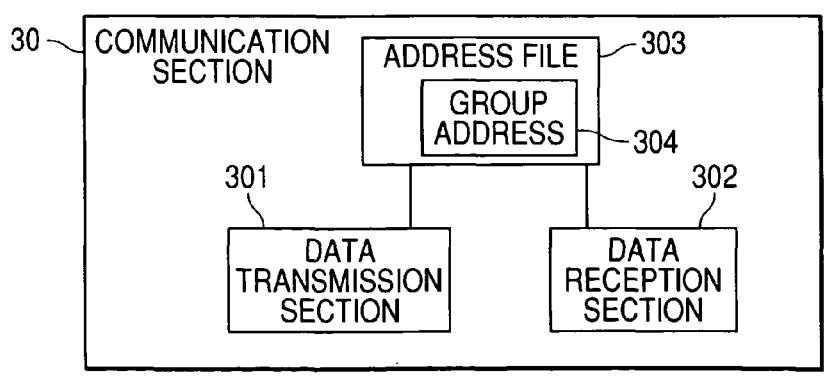
FIG. 4 is a block diagram showing another embodiment of the invention.

FIG. 4 is a block diagram showing another embodiment of the invention. FIG. 4 shows an exemplary configuration of the communication section provided in the time-division multiplex communication section 104.

In FIG. 4, communication section 30 is communication section for performing 1-to-N non-cyclic data communications.

Data transmission section 301 broadcasts data packets to a group aggress as the destinations of a plurality of communication stations. A group address may be generated from a network address or MAC address.

When the destination address of a transmitted data packet is the group address the home communication station belongs to, the data reception section 302 receives the transmitted data packet.

An address file 303 stores a group address 304 used for communications.

(3) Third Embodiment

Figure 5:
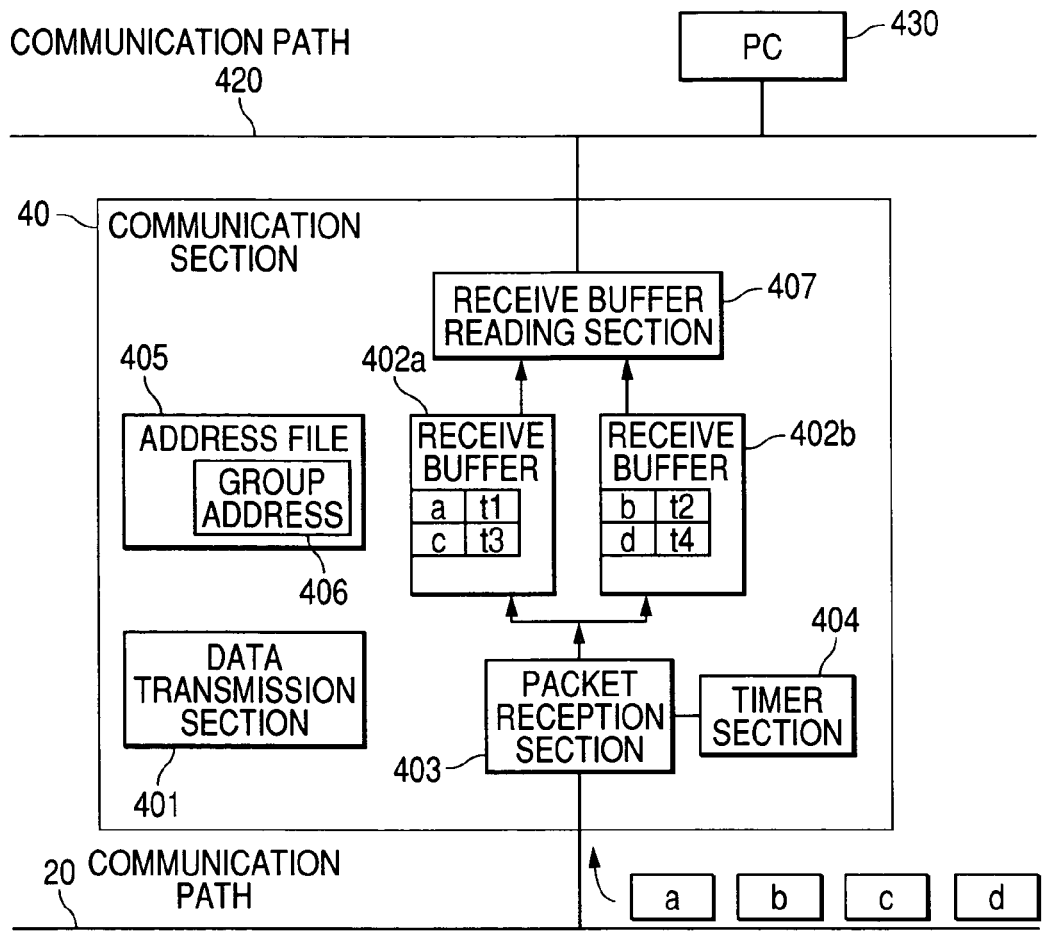
FIG. 5 is a block diagram showing another embodiment of the invention.

FIG. 5 is a block diagram showing another embodiment of the invention. FIG. 5 shows an exemplary configuration of the communication section provided in the time-division multiplex communication section 104.

In FIG. 5, communication section 40 is communication section for performing 1-to-N cyclic data communications. While a communication station is not shown in FIG. 5 for the purpose of clarity, the communication section 40 is located in a communication station.

Data transmission section 401 broadcasts data packets in a fixed cycle to a group aggress as the destinations of a plurality of communication stations.

Receive buffers 402a and 402b stores the reception time of a received data packet and the data packet as a pair.

When the destination address of a data packet received via communication path 20 is the group address to which the home communication station belongs, the data reception section 403 attaches the reception time to each of the received data packets and stores the data packets into the receive buffers 402a and 402b packets by packets. The reception time is acquired from timer section 404.

An address file 405 stores a group address 406 used for communications.

Receive buffer reading section 407 reads a data packet from a receive buffer 402a or 402b whichever contains the latest reception time. The receive buffer reading section 407 sends the read data packets to a higher-level PC 430 via a communication path 420. In this practice, the receive buffer reading section 407 completes a readout procedure within a time shorter than the cycle of broadcast communications by the data transmission section 401.

Data packets stored into the receive buffers 402a and 402b are those transmitted from another communication station via broadcast communications.

Operation of the embodiment shown in FIG. 5 will be described.

In FIG. 5, assume that data packets a, b, c, d are transmitted from the communication path 20 in this order and are received by the packet reception section 403 and that the destination address of each data packet is one the communication section 40 belongs to. The data packets a, b, c, d are transmitted over broadcast communications from the data transmission section 401 located in another communication station.

The packet reception section 403 attaches reception times t1, t2, t3, t4 to the data packets a, b, c, d.

The first received data packet a and the reception time t1 are stored in the receive buffer 402a.

The second received data packet b and the reception time t2 are stored in the receive buffer 402b.

In a similar way, storages are alternately changed; the data packet c and the reception time t3 are stored in the receive buffer 402a and the data packet d and the reception time t4 are stored in the receive buffer 402b, respectively.

The receive buffer reading section 407 reads a data packet from a receive buffer 402a or 402b whichever contains the latest reception time.

At the time point when the data packet a and the reception time t1 are stored in the receive buffer 402a, the receive buffer reading section 407 reads the data packet a and the reception time t1 from the receive buffer 402a.

At the time point when the data packet b and the reception time t2 are stored in the receive buffer 402b, the reception time t2 is the latest time. The receive buffer reading section 407 reads the data packet b and the reception time t2 from the receive buffer 402b.

In a similar way, the data packet c/reception time t3 pair and the data packet d/reception time t4 pair are read in this order.

The receive buffer reading section 407 completes a readout procedure within a time shorter than the cycle data packets are transmitted (cycle of broadcast communications by the data transmission section 401). Data packets a, b, c, d are read in this order.

The receive buffer reading section 407 transmits the read data packets and reception times to the higher-level PC 430. In other words, the latest data is sent to the PC 430.

According to the embodiment shown in FIG. 5, it is possible to read a latest data packet, which allows a higher-level side to monitor the latest data. For example, it is possible to monitor the latest state of a switch at the monitor point from a higher-level side.

While two receive buffers are provided in this embodiment, three or more receive buffers may be provided. When three receive buffers A, B, C are provided, received data packets are stored into the receive buffers A, B, C one by one in this order.

(4) Fourth Embodiment

Figure 6:
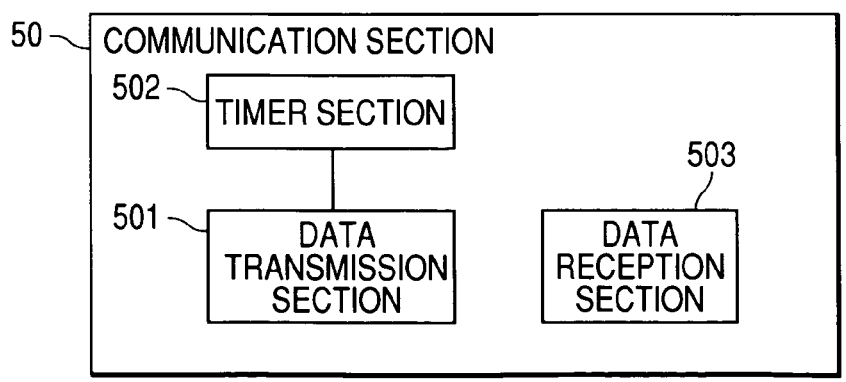
FIG. 6 is a block diagram showing another embodiment of the invention.

FIG. 6 is a block diagram showing another embodiment of the invention. FIG. 6 shows an exemplary configuration of communication section provided in the time-division multiple communication section 104.

In FIG. 6, communication section 50 is communication section for performing 1-to-1 non-cyclic immediate response data communications. While a communication station is not shown in FIG. 6 for the purpose of clarity, the communication section 50 is located in a communication station.

Data transmission section 501 broadcasts data packets to a single communication station and retransmits the data packet in case a normal acknowledgment is not returned from the receiving station within a predetermined time. The data transmission section 501 recognizes that the predetermined time has elapsed based on the time count of the timer section 502.

The data reception section 503 transmits a normal acknowledgment on normally receiving a data packet.

The data transmission section 501 retransmits a data packet independently of a time slot assigned to the home communication station.

The data reception section 503 transmits a normal acknowledgment independently of a time slot assigned to the home communication station.

This is described based on a specific example.

FIG. 7 FIG. 7 shows a connection example of a communication station.

In FIG. 7, communication stations 1A, 1B, 1C are connected to a communication path 20. These communication stations 1A, 1B, 1C are respectively assigned time slots. The communication stations 1A, 1B, 1C uses the communication path 20 to perform time-division-based communications. The communication stations 1A, 1B, 1C are respectively referred to as Communication Station A, Communication Station B, and Communication Station C.

FIG. 8 is a time chart showing the communication procedure of the communication station in FIG. 7.

As shown in FIG. 8, Communication Station A, Communication Station B, and Communication Station C are respectively assigned time slots TA, TB, TC (TC is not shown).

In the time slot TA, Communication Station A transmits a data packet to another communication station. In the shown example, Communication Station A transmits a data packet 1 to Communication Station C. Communication Station C returns a normal acknowledgment 510 to Communication Station A even in the time zone of the time slot TA. Communication Station C returns a normal acknowledgment 510 independently of a time slot of the home communication station.

Arrows in solid lines in the figure show communications in a time slot of the home communication station. Arrows in broken lines in the figure shows communications made elsewhere than a time slot of the home communication station.

Similarly, Communication Station B and Communication Station C transmit a data packet in the time slots TB and TC.

Assume that Communication Station A has transmitted a data packet 2 to Communication Station C in the time slot TA and a normal acknowledgment from Communication Station C is lost and a normal acknowledgment is not returned from Communication Station C after a predetermined time has elapsed. In this practice, Communication Station A retransmits a data packet independently of the time slot TA. In the figure, Communication Station A retransmits the data packet 2 in the time slot TB to Communication Station C in step 520. In response to this, Communication Station C returns a normal acknowledgment in the time slot TB.

According to the embodiment in FIG. 6, retransmission of a data packet and normal acknowledgment are made independently of the time slots of the communication stations involved. This prevents an increase in the response delay time of communications even in an environment where there are a larger number of communication stations. It is thus possible to provide a communication control system that is suitable for a large-sized communication system.

(5) Fifth Embodiment

Figure 9:
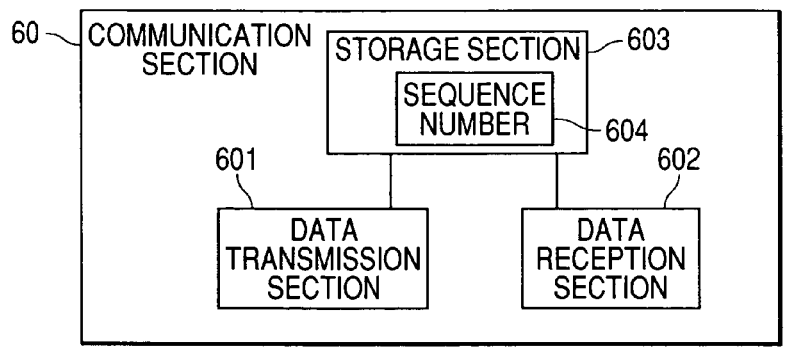
FIG. 9 is a block diagram showing another embodiment of the invention.

FIG. 9 is a block diagram showing another embodiment of the invention. FIG. 9 shows an exemplary configuration of communication section provided in the time-division multiple communication section 104.

In FIG. 9, communication section 60 is communication section for performing 1-to-1 non-cyclic negative acknowledgment data communications.

Data transmission section 601 transmits a data packet with a sequence number attached, the sequence number changed each time transmission is made.

Data reception section 602 checks the sequence number attached to a data packet each time the data packet is received and transmits a negative acknowledgment packet to a transmitting station when detecting a lost sequence number as a result of checking.

Storage section 603 stores a sequence number 604 used for communications.

On such communication section 60, the data reception section 602, on detecting a lost sequence number, transmits a negative acknowledgment packet with a sequence number specifying the latest normally received data packet attached.

Data transmission section 601 in the transmitting station, on receiving a negative acknowledgment packet, sequentially retransmits data packets starting with the undelivered data packet specified by the sequence number attached to the negative acknowledgment packet.

The data transmission section 601 transmits a delivery acknowledgment packet when not transmitting subsequent data packets for a predetermined time on completion of data packet transmission. In case the sequence number indicated by an acknowledgment packet returned from the receiving station in response to the delivery acknowledgment packet does not represent the last transmitted data packet, the data transmission section 601 sequentially retransmits data packets starting with the undelivered data packet specified by the returned acknowledgment packet.

The data reception section 602, on receiving the delivery acknowledgment packet, returns to the transmitting station an acknowledgment packet to which a sequence number specifying the last received data packet is attached.

Figure 10:
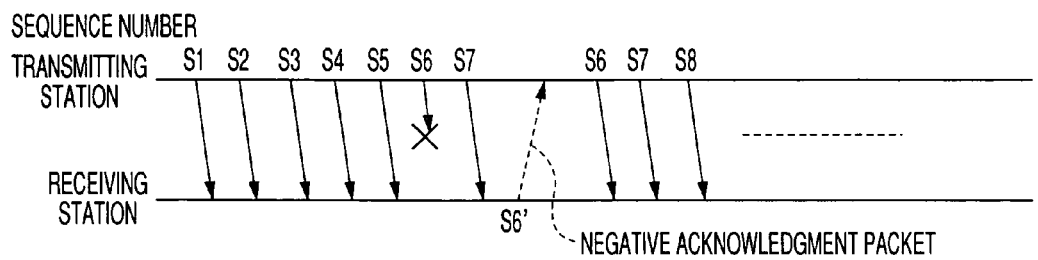
FIG. 10 explains the operation of the embodiment shown in FIG. 9.

FIG. 10 is a flowchart showing an example of communication procedure in the embodiment shown in FIG. 9.

The data transmission section 601 in the transmitting station sequentially transmits to the receiving station data packets with sequence numbers attached. The data transmission section 601 changes the sequence numbers to be attached to data packets each time transmission is made: S1, S2, and so on.

Assume that data packets having sequence numbers S1 through S7 have been transmitted but data corresponding to the sequence number S6 is not received. In this case, the data reception section 602 in the receiving station detects the loss of the sequence number S6 with the timing the data of the sequence number S7 is received.

The data reception section 602 in the receiving station, on receiving the sequence number S7, immediately informs the transmitting station a negative acknowledgment packet S6' including the information on the sequence number S6 of the lost data. Receiving this notice, the transmitting station retransmits data packets in the order of S6, S7, S8 and so on staring with the sequence number S6.

In this case, the data packet of the sequence number S7 is received twice by the receiving communication station although duplicate data is overwritten on a received data file so that no problems occur.

In this way, communications in the embodiment in FIG. 9 are negative acknowledgment type communications where a receiving party notifies a sending party an abnormality of any lost receive packet.

Figure 11:
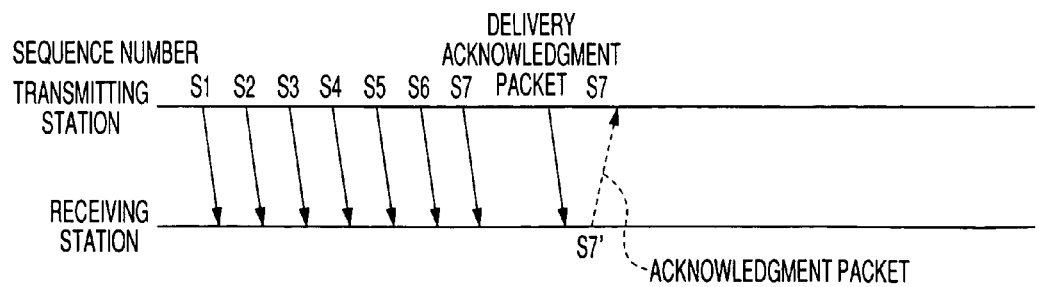
FIG. 11 explains the operation of the embodiment shown in FIG. 9.

FIG. 11 is a flowchart showing the communication procedure for a delivery acknowledgment packet and an acknowledgment packet in the embodiment shown in FIG. 9.

In case the delivery completion sequence number from the transmitting station is S7, a delivery acknowledgment packet including S7 is transmitted from the transmitting station to the receiving station. The receiving station acknowledges reception of S7 and transmits an acknowledgment packet S7 including information on S7 to the transmitting station.

According to such a communication procedure, a transmitting station and a receiving station know the latest transmission-complete sequence number thus retaining the equivalency of the sequence number of next data packet transmission.

In the communication procedure using sequence numbers between a sensing station and a receiving station described above, both stations own common information on sequence numbers.

For example, a common rule is owned by a transmitting station and a receiving station that sequence numbers are incremented from 1 and the maximum value is followed by 1. Sequence numbers may not be incremented from 1. For example, sequence numbers may be even numbers or odd numbers that are incremented, or a randomly variable numbers, as long as a common rule is owned by a transmitting station and a receiving station. The common rule is owned by the transmitting station and the receiving station in storage section 603.

The data reception section 602 may transmit a negative acknowledgment packet and an acknowledgment packet independently of a corresponding time slot. The communication procedure used in this case is similar to the communication procedure shown in FIG. 7.

The following advantages are obtained by the embodiment shown in FIG. 9.

The receiving station checks the sequence number of each data packet and transmits a negative acknowledgment packet to the transmitting station on detecting a loss of a sequence number. This provides the following advantages:

(1) There is no need to make a normal acknowledgment each time transmission is made. It is thus possible to keep the maximum throughput of data packet transmission.

(2) A negative acknowledgment packet is transmitted to a transmitting station when a loss of a sequence number is detected in a received packet rather than reception acknowledgment is made after a predetermined number of packets are transmitted. This allows real time detection of fault.

(6) Sixth Embodiment

Figure 12:
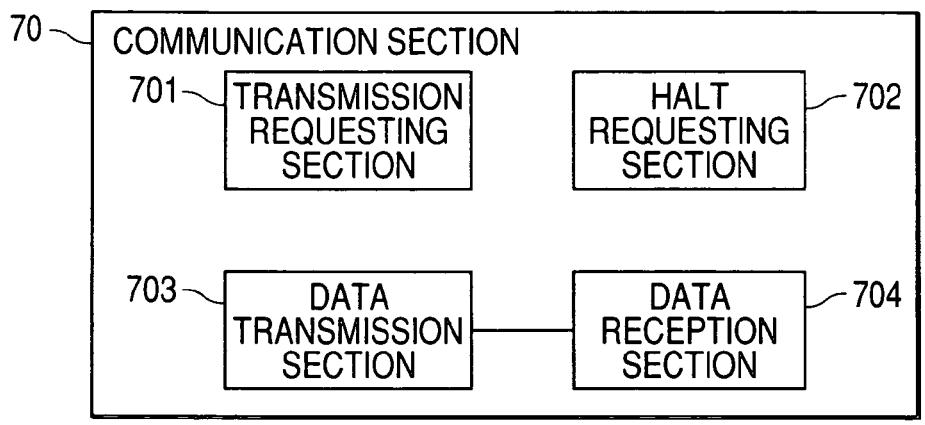
FIG. 12 is a block diagram showing another embodiment of the invention.

FIG. 12 is a block diagram showing another embodiment of the invention. FIG. 12 shows an exemplary configuration of communication section provided in the time-division multiple communication section 104.

In FIG. 12, communication section 70 is communication section for performing 1-to-1 cyclic data communications.

In FIG. 12, transmission requesting section 701 requests cyclic transmission of data packets addressed to a specified communication station by way of a start request packet based on a data acquisition request.

Halt requesting section 702 requests halt of cyclic transmission of data packets by way of a halt request packet;

Data transmission section 703 starts transmission of a data packet specified by the start request packet to a requesting communication station in a cycle specified by the start request packet on receiving the start request packet. The data transmission section 703 stops transmission of the data packet on receiving a halt request packet.

Data reception section 704 receives the data packet.

Figure 13:
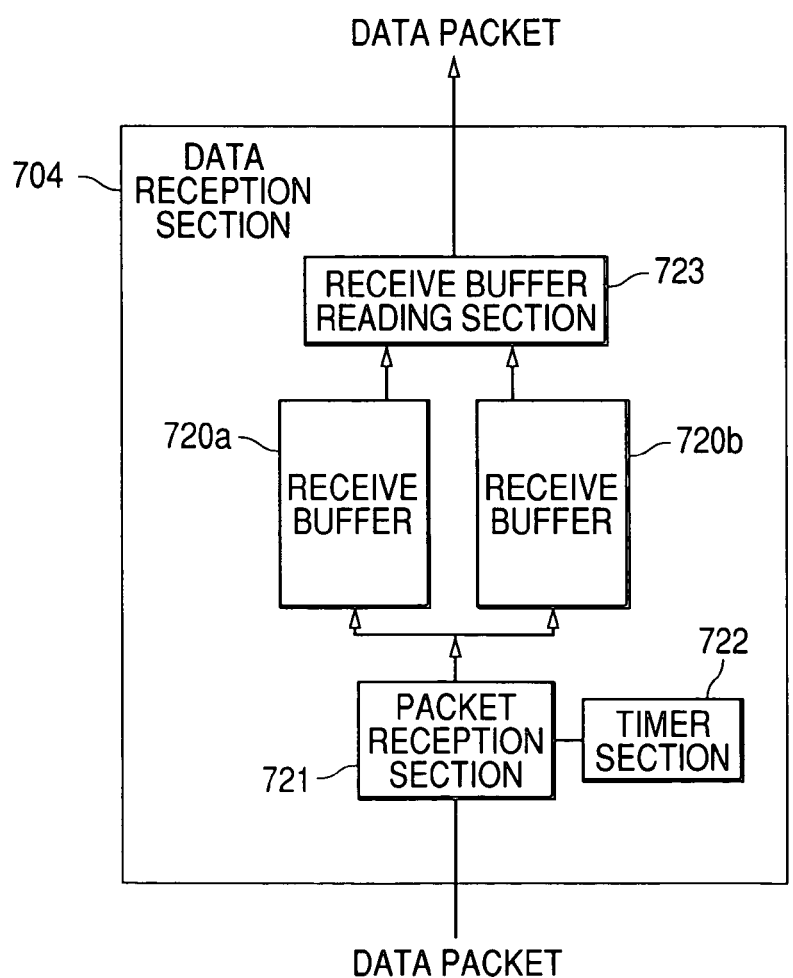
FIG. 13 shows an exemplary configuration of the data reception section shown in FIG. 12.

FIG. 13 shows an exemplary configuration of the data reception section 704.

In FIG. 13, receive buffers 720*a*, 720*b*, packet reception section 721, timer section 722 and reception buffer reading section 723 has respectively the same configuration as the receive buffers 402*a*, 402*b*, packet reception section 403, timer section 404 and reception buffer reading section 407.

The data reception section 704 also attaches a reception time to a received data packet and stores data packets into a plurality of receive buffers one by one. The data reception section 704 reads a data packet with the latest reception time attached from the plurality of receive buffers and sends it to a higher-level side.

In the embodiment shown in FIG. 12, the communication station does not transmit data packets on its own initiative but transmits data packets to a requesting communication station on receiving a data acquisition request. On receiving a halt request, the communication station stops transmission. That is, the communication station communicates with another target communication station only when necessary. This reduces the overall communication volume compared with 1-to-N broadcast communications thus reducing the memory area of the communication station. This configuration is particularly effective for a larger number of communication stations or large amount of communication data.

(7) Seventh Embodiment

FIG. 14 is a block diagram showing another embodiment of the invention.

In FIG. 14, a communication station 80 is connected to a communication path 20. The communication station performs communications in accordance with a standard protocol such as UDP or IP.

Transmission queue section 801*a* through 801*c* are present between the second and third layers of an OSI (Open Systems Interconnection) layer model and constitute a queue of transmission packets. Such transmission queue section 801*a* through 801*c* are provided per communication type.

Reception queue section 802*a* through 802*c* are present between the second and third layers of an OSI (Open Systems Interconnection) layer model and constitute a queue of reception packets. Such reception queue section 802*a* through 802*c* are provided per communication type.

Transmission section 803 has functions of the first and second layers of an OSI layer model and transmits the packets in the transmission queue section 801*a* through 801*c* in a predetermined order of priority, with priority information corresponding to the transmission queue section 801*a* through 801*c* attached.

Reception section 804 has functions of the first and second layers of an OSI layer model and divides and stores received packets among the reception queue section 802*a* through 802*c* in accordance with the attached priority information.

Reading section 805 reads data stored in the reception queue section 802*a* through 802*c* in accordance with a predetermined order of priority and sends the data to a higher-level PC 430.

The transmission queue section 801*a*, 801*b*, 801*c* have priorities in this descending order. In the transmission queue section 801*a*, 801*b*, 801*c* are respectively provided queues for high-priority data, medium-priority data and low-priority data.

The reception queue section 802*a*, 802*b*, 802*c* have priorities in this descending order. In the reception queue section 802*a*, 802*b*, 802*c* are respectively provided queues for high-priority data, medium-priority data and low-priority data.

When such priorities are given, the transmission section 803 executes, for example, transmission processing of the transmission queue section 801*b* when data is absent in the transmission queue section 801*a*.

The reading section 805 executes the reception processing of the reception queue section 802*c* when data is absent in the reception queue section 802*a*, 802*b*.

Time-division multiplex communications using the time slots of the embodiment shown in FIG. 2 may be performed in the embodiment shown in FIG. 14.

According to the embodiment shown in FIG. 14, buffers given proprieties are provided. This makes it possible for priority data to surpass non-priority data on a transmission path that requires real time properties, thereby allowing real time communications of priority data.

In the embodiments described above, a communication station is present on an operation monitoring apparatus or a controller of a distributed control system.

The invention claimed is:

1. A communication control system for causing a communication station performing communication in accordance with a standard protocol to perform multiplex communication based on time division of a communication band, the communication control system controls a plant operation and comprises:

a time slot assignment section which divides a communication cycle as a basic cycle of time division into time slots, and assigns a set of communication stations and a type of a communication section to each of the time slots; and a time-division multiplex communication section which performs communication within a period of the time slot in accordance with the set of communication stations and type of communication section assigned by the time slot assignment section, wherein each communication station is equipped with a timer section and a time-synchronous communication section, the type of the communication section includes time-synchronous communication, non-cycle data communication, and cycle data communication, the time-synchronous communication section performs time-synchronous communication by using the time slot in which the time-synchronous communication is assigned, when the time-synchronous communication section transmits a time-synchronous communication frame to each communication station, time of the timer section of each communication station and the time slots of all communication stations are synchronized, said communication control system controls communications in an industrial application, wherein said communication control system controls communications in a control bus connecting an operation monitoring apparatus and a controller, said operation monitoring apparatus operates and monitors a plant, and said controller controls the plant under the monitoring of said operation monitoring apparatus.

2. The communication control system according to claim 1, wherein the set of communication stations is generated by grouping the communication stations based on addresses of the respective communication stations.

3. The communication control system according to claim 1 or 2, wherein the type of the communication section includes at least one of 1-to-N non-cyclic data communication, 1-to-N cyclic data communication, 1-to-1 non-cyclic data communication and 1-to-1 cyclic data communication.

4. The communication control system according to claim 3, wherein the 1-to-1 non-cyclic data communication is at least one of an acknowledge type communication which is the 1-to-1 non-cyclic data communication and in which a receiving station returns an acknowledgment to a transmitting station when the receiving station normally receives data, and a negative acknowledge type communication which is the 1-to-1 non-cyclic data communication and in which the receiving station returns a negative acknowledgment to the transmitting station when the receiving section cannot receive the data normally.

5. The communication control system according to claim 1, wherein the communication section is a communication section for performing 1-to-N non-cyclic data communication, and the communication section includes:

a data transmission section for broadcasting data packets to a group address as destinations of a plurality of communication stations; and a data reception section for receiving a transmitted data packet when a destination address of the transmitted data packet is a group address to which the home communication station belongs.

6. The communication control system according to claim 1, wherein the communication section is a communication section for performing 1-to-N cyclic data communication, and the communication section includes:

a data transmission section for broadcasting data packets in a fixed cycle to a group address as destinations of a plurality of communication stations;

a plurality of receive buffers each of which stores reception time of a received data packet and the data packet as a pair;

a packet reception section which attaches the reception time to the received data packet and sequentially stores the data packet one by one into the plurality of receive buffers when a destination address of the received data packet is a group address to which the home communication station belongs; and a receive buffer reading section which reads the data packet from the receive buffer having the latest reception time among the plurality of receive buffers, completes readout in a period shorter than the cycle of the broadcasting, and sends the data packet to a higher-level side.

7. The communication control system according to claim 1, wherein the communication section is a communication section for performing 1-to-1 non-cyclic data communication and an immediate-response type communication, and the communication section includes:

a data transmission section for transmitting a data packet to a single communication station, and retransmits the data packet in a case where a normal acknowledgment is not returned from a receiving station within a predetermined time; and a data reception section for transmitting a normal acknowledgment when a data packet is normally received.

8. The communication control system according to claim 7, wherein the data transmission section retransmits the data packet independently of the time slot.

9. The communication control system according to claim 7, wherein the data reception section transmits the normal acknowledgment independently of the time slot.

10. The communication control system according to claim 1, wherein the communication section is a communication section for performing 1-to-1 non-cyclic data communication and a negative acknowledge type communication, and the communication section includes:

a data transmission section for transmitting a data packet with a sequence number being attached, the sequence number being changed for each transmission; and a data reception section which checks a sequence number being attached to a data packet each time the data packet is received, and transmits a negative acknowledgment packet to a transmitting station when detecting a lost sequence number as a result of checking, wherein the data reception section attaches a sequence number specifying the data packet that is received normally at the latest to the negative acknowledgment packet, when the data transmission section receives the negative acknowledgment packet, the data transmission section sequentially retransmits data packets starting with an undelivered data picket being specified by the sequence number attached to the negative acknowledgment packet, when the data transmission section does not transmit a subsequent data packet for a predetermined time on completion of the transmission of the data packets, the data transmission section transmits a delivery acknowledgment packet to a receiving station, and when a sequence number specified by a returned acknowledgment packet does not indicate the last transmitted data packet, the data transmission section sequentially retransmits data packets starting with an undelivered data packet specified by the returned acknowledgment packet, and when the data reception section receives the delivery acknowledgment packet, the data reception section returns to the transmitting station an acknowledgment packet to which a sequence number specifying the last received data packet is attached.

11. The communication control system according to claim 10, wherein the data reception section performs transmission of the negative acknowledgment packet and the acknowledgment packet independently of the time slot.

12. The communication control system according to claim 1, wherein the communication section is a communication section for performing 1-to-1 cyclic data communication, and the communication section includes:
 a transmission requesting section for requesting cyclic transmission of a data packet addressed to a specified communication station by a start request packet, based on a data acquisition request;
 a halt requesting section for requesting a halt of cyclic transmission of the data packet by a halt request packet;
 a data transmission section which, when receiving the start request packet, starts transmission of a data packet being specified by the start request packet to a communication station of a requesting source in a cycle specified by the start request packet, and halts transmission of the data packet on receiving a halt request packet; and
 a data reception section for receiving the data packet wherein the data reception section includes:
 a plurality of receive buffers each of which stores reception time of the received data packet and the data packet as a pair;
 a packet reception section which attaches the reception time to the received data packet and sequentially stores the data packet one by one into the plurality of receive buffers; and
 a receive buffer reading section which reads the data packet from the receive buffer having the latest reception time among the plurality of receive buffers, completes reading out in a period shorter than the cycle specified by the start request packet, and sends the data packet to a higher-level side.

13. The communication control system according to claim 1, which performs time-division multiplex communication by using the time slots, the communication control system comprising:
 a plurality of transmission queue sections which exists between predetermined layers of an OSI layer model, is provided for each type of communication and constitutes a queue of transmission packets;
 a plurality of reception queue sections which exists between predetermined layers of the OSI layer model, is provided for each type of the communication and constitutes a queue of reception packets;
 a transmission section for transmitting packets in the plurality of transmission queue sections in accordance with a predetermined priority order with priority information corresponding to the transmission queue section being attached;
 a reception section for distributing and storing received packets in the plurality of reception queue sections in accordance with the priority information; and
 a reading section which reads data stored in the plurality of reception queue sections in accordance with a predetermined priority order, and sends the data to a higher-level side.

14. The communication control system according to claim 13, wherein the transmission section executes transmission processing of specific transmission queue section among the plurality of transmission queue sections in a case where data does not exist in the transmission queue section that has higher priority over the specific transmission queue section.

15. The communication control system according to claim 13, wherein the reading section executes reading processing of specific reception queue section among the plurality of reception queue sections in a case where data does not exists in the reception queue section that has higher priority over the specific reception queue section.

16. The communication control system according to any one of claim 13-15, wherein the transmission queue section and the reception queue section exist between a second layer and a third layer of an OSI layer model.

17. The communication control system according to claim 1, wherein the standard protocol is UDP or IP.

* * * * *